(12) United States Patent
Yin et al.

(10) Patent No.: US 7,523,234 B2
(45) Date of Patent: Apr. 21, 2009

(54) MOTION ESTIMATION WITH FAST SEARCH BLOCK MATCHING

(75) Inventors: Peng Yin, Plainsboro, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 496 days.

(21) Appl. No.: 10/564,662

(22) PCT Filed: Mar. 2, 2004

(86) PCT No.: PCT/US2004/006292

§ 371 (c)(1),
(2), (4) Date: Jan. 13, 2006

(87) PCT Pub. No.: WO2005/017759

PCT Pub. Date: Feb. 24, 2005

(65) Prior Publication Data

US 2006/0165175 A1 Jul. 27, 2006

Related U.S. Application Data

(60) Provisional application No. 60/487,458, filed on Jul. 15, 2003.

(51) Int. Cl.
*G06F 13/12* (2006.01)
(52) U.S. Cl. .................. 710/68; 382/236; 382/238; 382/239
(58) Field of Classification Search .................. None
See application file for complete search history.

(56) References Cited

U.S. PATENT DOCUMENTS 5,682,209 A   10/1997   Borgwardt 6,269,174 B1   7/2001   Koba (Continued)

OTHER PUBLICATIONS

Al-Mualla et al., Simplex Minimization for Single- and Multiple-Reference Motion Estimation, 2001, IEEE, pp. 1209-1220.*

(Continued)

*Primary Examiner*—Eron J Sorrell
(74) *Attorney, Agent, or Firm*—Robert D. Shedd; Jeffrey M. Navon

(57) ABSTRACT

A video encoder and corresponding method are provided for encoding video signal data for an image block and a particular reference picture index to predict the image block, where the encoder includes a fast search block motion estimator for providing motion vectors corresponding to the at least one particular reference picture, the motion estimator comprising a fast search block matching portion for performing fast search block matching while excluding non-optimal search points in accordance with a comparison of a normalization of the image block pixels against a normalization of the reference picture pixels, the fast search block matching portion having an output responsive to the at least one particular reference picture; and the corresponding method includes receiving a substantially uncompressed image block, block matching the image block in correspondence with at least one particular reference picture while excluding non-optimal search points in accordance with a comparison of a normalization of the image block pixels against a normalization of the reference picture pixels, computing motion vectors corresponding to a difference between the image block and the at least one particular reference picture, and motion compensating the at least one particular reference picture in correspondence with the motion vectors.

20 Claims, 2 Drawing Sheets

U.S. PATENT DOCUMENTS 6,363,117 B1  3/2002  Kok
6,563,874 B1  5/2003  Lu
6,757,330 B1  6/2004  Hsu

OTHER PUBLICATIONS

Girod et al., Using Multiple Global Motion Models for Improved Block-Based Video Coding, 1999, IEEE, pp. 56-60.*

Search Report dtd. Aug. 6, 2004.

Wang Ze et al., "Speed Optimization of Block Matching Motion Estimation Algorithms" Journal of Northestern University (Natural Science), Apr. 2003, pp. 1-13, vol. 24, No. 4, School of Information Science & Engineering, Northeastern University, Senyang 110004, China.

* cited by examiner

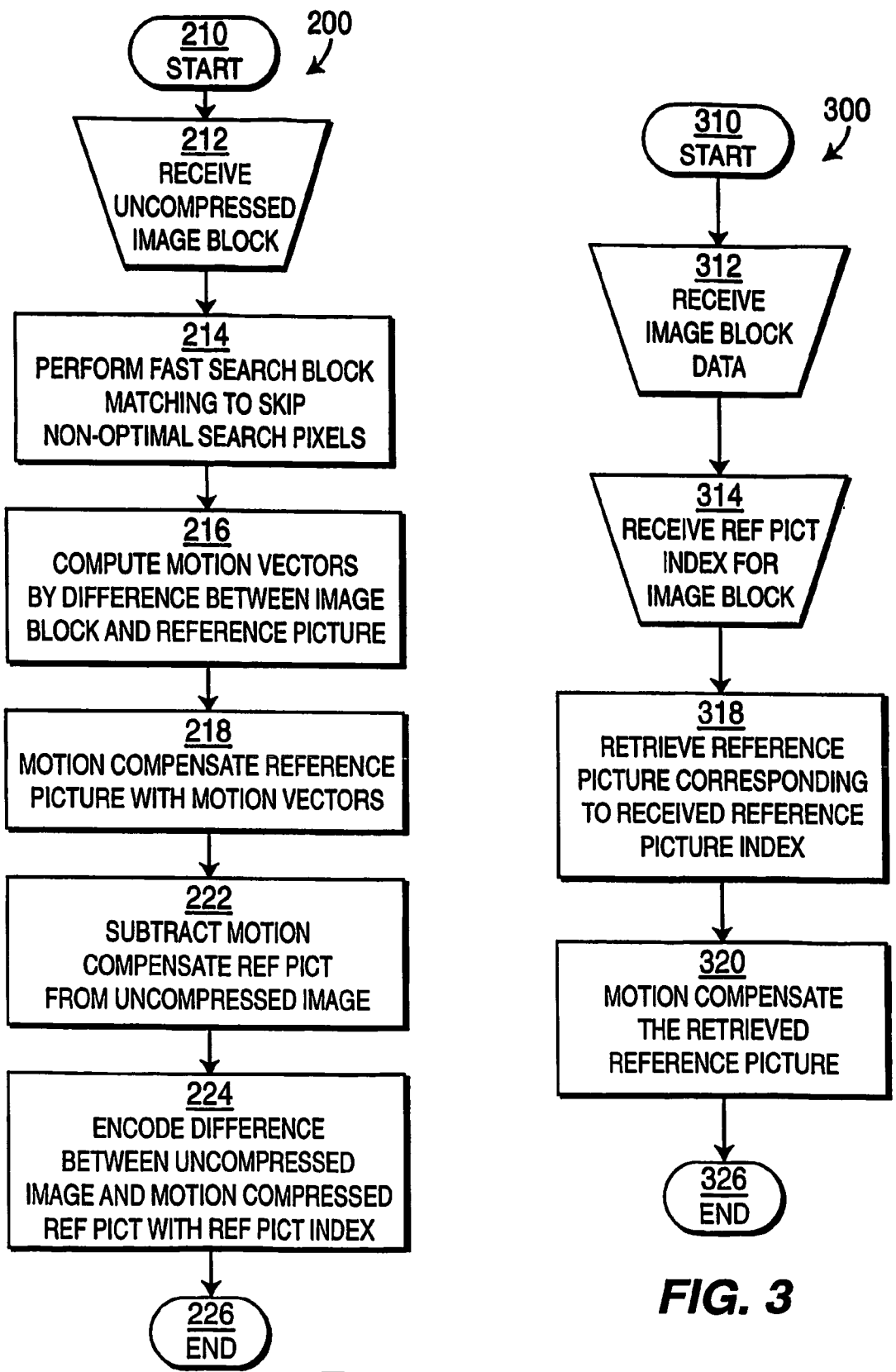

MOTION ESTIMATION WITH FAST SEARCH BLOCK MATCHING

CROSS-REFERENCE TO RELATED APPLICATIONS

This application claims the benefit, under 35 U.S.C. § 365 of International Application PCT/US04/006292, filed Mar. 2, 2004, which was published in accordance with PCT Article 21(2) on Feb. 24, 2005 in English and which claims the benefit of U.S. provisional patent application No. 60/487,458, filed Jul. 15, 2003.

FIELD OF THE INVENTION

The present invention generally relates to video encoders and decoders, and in particular, towards motion estimation algorithms in video encoders and decoders.

BACKGROUND OF THE INVENTION

Video data is generally processed and transferred in the form of bit streams. Typical video compression coders and decoders ("CODECs") gain much of their compression efficiency by forming a reference picture prediction of a picture to be encoded, and encoding the difference between the current picture and the prediction. The more closely that the prediction is correlated with the current picture, the fewer bits that are needed to compress that picture, thereby increasing the efficiency of the process. Thus, it is desirable for the best possible reference picture prediction to be formed.

In many video compression standards, including Moving Picture Experts Group ("MPEG")-1, MPEG-2 and MPEG-4, the motion between a previous reference picture and the current picture is estimated to form a motion compensated version of the previous reference picture. The motion compensated version of the previous reference picture is used as a prediction for the current picture, and only the difference between the current picture and the prediction is coded.

Motion estimation plays an important role in current video coding systems, and is generally the most computationally complex part of the encoder. The block matching algorithm is employed by most current video coding standards. A full search strategy, which estimates the amount of motion on a block-by-block basis, is a popular motion estimation method. Unfortunately, the complexity of the full search strategy is extremely high, especially for advanced video coding standards such as H.264, which employ multi-reference pictures and multi-block types. Several fast-search algorithms, such as the three step search, newer three step search, diamond search, zonal search, hierarchical or multi-resolution search, or combinations thereof have been proposed. Such algorithms reduce the complexity by reducing the number of searching points. Unfortunately, they tend to trap into local minima on the error surface. Thus, their performance is generally worse than the full search strategy.

Block motion estimation is employed by most current video coding standards to reduce the bit rate. Block motion estimation for video coding has been well explored but few algorithms have been proposed for multi-reference picture and multi-block type selection, such as in H.263++ and JVT/H.264/MPEG AVC.

In H.264, various modes are provided for motion compensation. Each motion-compensated macroblock mode corresponds to a fixed size block. The block can be partitioned into 16×16, 16×8, 8×16, and 8×8. The 8×8 block can be further sub-partitioned into block sizes of 8×4, 4×8, or 4×4. Thus, 7 block types are supported in total. The prediction signal for each predictive-coded m×n block is obtained by displacing an area of the corresponding reference picture, which is specified by a translational motion vector that is differentially coded from a motion vector predictor. H.264 also supports multi-picture motion-compensated prediction. That is, more than one prior coded picture can be used as a reference for building the prediction signal of predictive coded blocks. Accordingly, for motion estimation, the encoder has to make decisions for which block type and which reference picture should be selected. This multi-reference picture and multi-block type selection makes motion searching more complicated.

Currently, full search ("FS") and several fast search algorithms have been proposed for motion searching, such as, for example, the three step search, new three step search, diamond search, zonal search, and hierarchical search. Among these, generally only the full search achieves optimal solutions. Thus, what is needed is a method for reducing complexity over the full search algorithm while achieving optimal solutions.

SUMMARY OF THE INVENTION

These and other drawbacks and disadvantages of the prior art are addressed by an apparatus and method for motion estimation with fast search block matching in video encoders and decoders.

A video encoder is provided for encoding video signal data for an image block and a particular reference picture index to predict the image block, where the encoder includes a fast search block motion estimator for providing motion vectors corresponding to the at least one particular reference picture, the motion estimator comprising a fast search block matching portion for performing fast search block matching while excluding non-optimal search points in accordance with a comparison of a normalization of the image block pixels against a normalization of the reference picture pixels, the fast search block matching portion having an output responsive to the at least one particular reference picture.

A corresponding method for encoding video signal data for an image block includes receiving a substantially uncompressed image block, block matching the image block in correspondence with at least one particular reference picture while excluding non-optimal search points in accordance with a comparison of a normalization of the image block pixels against a normalization of the reference picture pixels, computing motion vectors corresponding to a difference between the image block and the at least one particular reference picture, and motion compensating the at least one particular reference picture in correspondence with the motion vectors. These and other aspects, features and advantages of the present invention will become apparent from the following description of exemplary embodiments, which is to be read in connection with the accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 shows a flowchart for an encoding process in accordance with the principles of the present invention;

FIG. 3 shows a flowchart for a decoding process in accordance with the principles of the present invention.

DETAILED DESCRIPTION OF PREFERRED EMBODIMENTS

Figure 1:
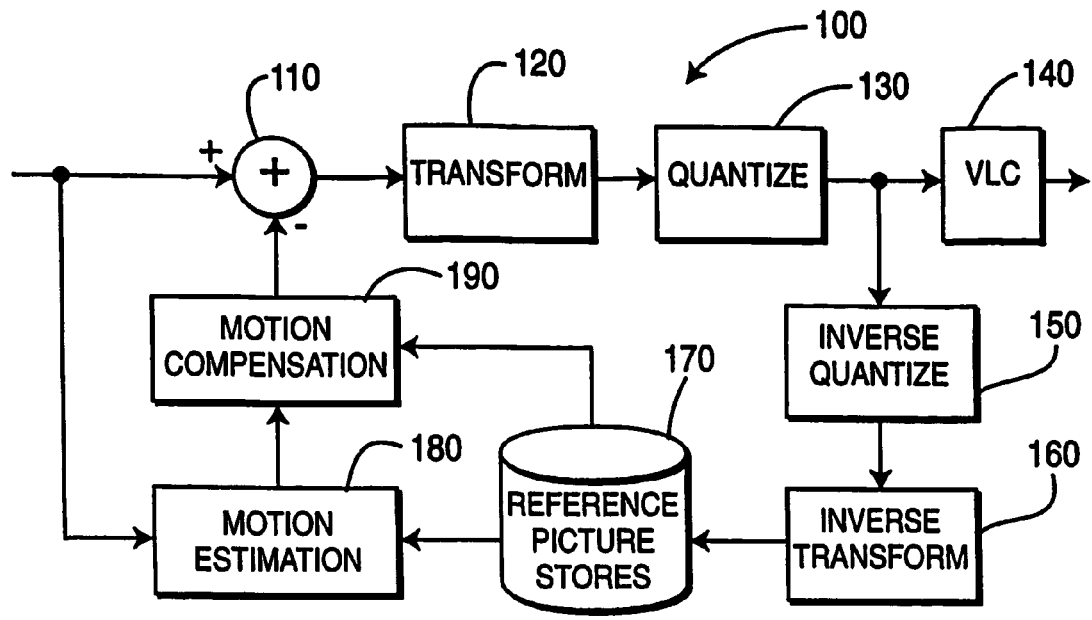
FIG. 1 shows a block diagram of a video encoder with fast search block matching motion estimation in accordance with the principles of the present invention.

The present invention performs motion estimation using fast search block matching. Embodiments of the present invention use successive elimination to discard the non-optimal searching points and use pre-computed data to save computations without sacrificing the optimality of the full search method.

Motion estimation techniques have been widely studied. For each motion block of a picture being coded, a motion vector is chosen that represents a displacement of the motion block from a reference picture. In an exhaustive search method within a search region, every displacement within a pre-determined range of offsets relative to the motion block position is tested. The test includes calculating the sum of the absolute difference ("SAD") or mean squared error ("MSE") of each pixel in the motion block in the current picture with the displaced motion block in a reference picture. The offset with the lowest SAD or MSE is selected as the motion vector. Numerous variations on this technique have been proposed, such as, for example, three-step search and rate-distortion optimized motion estimation.

The following description merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means that can provide those functionalities as equivalent to those shown herein.

A fast search block matching motion estimation algorithm can achieve comparable quality to full search block matching while reducing complexity. The presently disclosed successive elimination algorithm embodiment employs a metric based on the triangle inequality to early reject non-optimal searching points and reuses pre-computed data to reduce the number of computations. This algorithm can be applied to both software and hardware embodiments. It may also be applied to other heuristic fast search algorithms.

As shown in FIG. 1, a video encoder with fast search block matching motion estimation is indicated generally by the reference numeral 100. An input to the encoder 100 is connected in signal communication with a non-inverting input of a summing junction 110. The output of the summing junction 110 is connected in signal communication with a block transformer 120. The transformer 120 is connected in signal communication with a quantizer 130. The output of the quantizer 130 is connected in signal communication with a variable length coder ("VLC") 140, where the output of the VLC 140 is an externally available output of the encoder 100.

The output of the quantizer 130 is further connected in signal communication with an inverse quantizer 150. The inverse quantizer 150 is connected in signal communication with an inverse block transformer 160, which, in turn, is connected in signal communication with a reference picture store 170. A first output of the reference picture store 170 is connected in signal communication with a first input of a fast search block matching motion estimator 180. The input to the encoder 100 is further connected in signal communication with a second input of the fast search block matching motion estimator 180.

Although the invention described here is conceptually part of the motion estimation block, it shall be understood that a separate fast block searching portion may feed a motion estimator portion in alternate embodiments, with the signaling between the portions indicating which operating points to test or not to test. The output of the fast search block matching motion estimator 180 is connected in signal communication with a first input of a motion compensator 190. A second output of the reference picture store 170 is connected in signal communication with a second input of the motion compensator 190. The output of the motion compensator 190 is connected in signal communication with an inverting input of the summing junction 110.

Turning to FIG. 2, an exemplary process for encoding video signal data for an image block in accordance with fast search block matching motion estimation is indicated generally by the reference numeral 200. The process includes a start block 210 that passes control to an input block 212. The input block 212 receives substantially uncompressed image block data, and passes control to a function block 214. The function block 214 performs fast search block matching while excluding non-optimal search points in accordance with a comparison of a normalization (e.g., SAD, MSE) of the current picture pixels against the same normalization of the reference picture pixels. The function block 214 passes control to a function block 216, which computes motion vectors corresponding to the difference between the image block and the particular reference picture, and passes control to a function block 218. The function block 218 motion compensates the particular reference picture in correspondence with the motion vectors, and passes control to a function block 222.

The function block 222 subtracts the motion compensated reference picture from the substantially uncompressed image block, and passes control to a function block 224. The function block 224, in turn, encodes a signal with the difference between the substantially uncompressed image block and the motion compensated reference picture along with the corresponding index of the particular reference picture, and passes control to an end block 226.

Turning now to FIG. 3, an exemplary process for decoding video signal data for an image block is indicated generally by the reference numeral 300. The process includes a start block 310 that passes control to an input block 312. The input block 312 receives the image block compressed data, and passes control to an input block 314. The input block 314 receives at least one reference picture index with the data for the image block, each reference picture index corresponding to a particular reference picture. The input block 314 passes control to a function block 318, which retrieves a reference picture corresponding to each of the received reference picture indices, and passes control to a function block 320. The function block 320, in turn, motion compensates the retrieved reference picture, and passes control to an end block 326.

Figure 4:
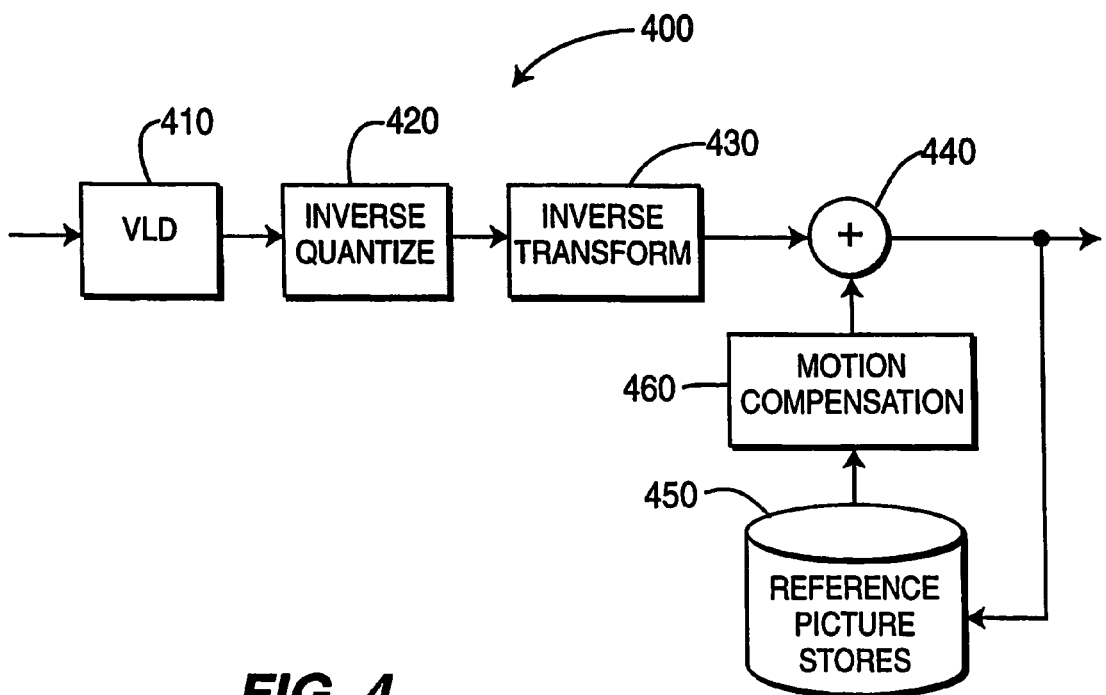
FIG. 4 shows a block diagram of a video decoder for use with fast search block matching motion estimation in accordance with the principles of the present invention.

As shown in FIG. 4 a video decoder for use with fast search block matching motion estimation is indicated generally by the reference numeral 400. The video decoder 400 includes a variable length decoder ("VLD") 410 connected in signal communication with an inverse quantizer 420. The inverse quantizer 420 is connected in signal communication with an inverse transformer 430. The inverse transformer 430 is connected in signal communication with a first input terminal of an adder or summing junction 440, where the output of the summing junction 440 provides the output of the video decoder 400. The output of the summing junction 440 is connected in signal communication with a reference picture store 450. The reference picture store 450 is connected in signal communication with a motion compensator 460, which is connected in signal communication with a second input terminal of the summing junction 440.

In operation, a full search may first divide the current picture into non-overlapped blocks, and search for each of them in a reference picture. The full search is performed by testing all the points within a search area around the search center, and the final position is found having a minimal cost function. Although the full search method reaches an optimal solution, it requires a high computational cost. In a video coding method, if the search range is S, the number of reference pictures is RN (in H.26L, RN can be up to 15), the number of block types in a macroblock (usually 16×16) is BN (in H.26L, BN can be up to 7), then for every macroblock, the total number of searching points is (2S+1)*(2S+1)*BN*RN, or more than $4S^2$*BN*RN searching points.

Two techniques are utilized in conjunction with embodiments of the present invention to increase computational speed over the full search method. One is data reuse and the other is successive elimination. For data reuse, the sum of absolute difference ("SAD") result for the smallest-sized block type (4×4) is stored to be reused by larger-sized block types. Thus, for every macroblock, the required computations equivalent to the searching point is around $4S^2$*RN.

A mathematical inequality known as the triangle inequality is used to speed-up a full search in a Successive Elimination Algorithm ("SEA"). In block matching, the sum of absolute difference ("SAD") or sum of square difference ("SSD"), for example, may be used as search criteria to measure the distortion between the motion-compensated prediction c[x,y] from a reference picture and the original signal s[x,y] in the current picture. A set B includes of all the sampling positions of the blocks considered.

Assuming B is partitioned into subregions $B_n$, so that:

$$B = \bigcup_n B_n, \quad \text{and} \quad \bigcap_n B_n = \phi \qquad (1)$$

Then:

$$D(s, c) = \sum_{[x,y] \in B} |s[x,y] - c[x,y]|^p = \sum_n \sum_{[x,y] \in B_n} |s[x,y] - c[x,y]|^p$$

The triangle inequality is applied for all $B_n$, yielding:

$$D(s, c) = \sum_{[x,y] \in B} |s[x,y] - c[x,y]|^p \geq \qquad (2)$$

$$\sum_n \left| \left( \sum_{[x,y] \in B_n} |s[x,y]|^p \right)^{1/p} - \left( \sum_{[x,y] \in B} |c[x,y]|^p \right)^{1/p} \right|^p = \tilde{D}(s, c)$$

In the above formulae, p=1 for SAD and p=2 for SSD.

SAD or SSD may be adopted as a distortion measure in video CODECs. Without loss of generality, SAD is used in the following exemplary discussion and equation (2) is written explicitly in equation (3). Equation (3) may be simplified by removing some of the absolute value operators since it may be assumed that video pixel data values are always positive.

$$D(s, c) = \sum_{[x,y] \in B} |s[x,y] - c[x,y]| \geq \qquad (3)$$

$$\sum_n \left| \left( \sum_{[x,y] \in B} s[x,y] \right) - \right.$$

$$\left\| \left( \sum_{[x,y] \in B} c[x,y] \right) \right\| = \tilde{D}(s,c)$$

SEA is described as follows:

Assume Dmin is the smallest distortion value previously computed in the block motion search;

$$\text{then discard block } c \text{ if } \tilde{D}(s,c) \geq D\text{min};\quad(4)$$

otherwise, perform full search.

The overhead of computing $\tilde{D}(s,c)$ (the right hand side of equation (3)) can be partitioned into two parts. The first part is related to computing the sum norm $$\sum_{[x,y] \in B} c[x,y] \text{ and } \sum_{[x,y] \in B} s[x,y].$$

The second part is related to computing the sum of absolute difference of sum norm as in equation (3), which depends on the size of the subregions. For multi-block type motion estimation, the symmetry division is preferred. If the subregion is 4×4, the overhead is equivalent to about $S^2/4*BN*RN$ searching points for one macroblock. If the subregion is 2×2, the overhead is about $S^2*BN*RN$. The required memory to store the sum norm is about $(RN+1)*$picture size. The efficiency of SEA relies on how tight the lower bound could be. To compensate the impact of overhead and reduce the full searching points, the initial determination of Dmin and the searching order is important.

In preferred embodiments, data reuse is applied to reduce the overhead of computing $\tilde{D}(s,c)$ (the right hand side of equation (3)) for SEA. The computation of $\tilde{D}(s,c)$ can be partitioned into two parts. The first part is related to computing the sum norm $$\sum_{[x,y] \in B} s[x,y] \text{ and } \sum_{[x,y] \in B} c[x,y].$$

The second part is related to computing the sum of absolute difference of sum norm as in equation (3).

In more detail, to compute $\tilde{D}(s,c)$, calculations are made of sum norms $$\sum_{[x,y] \in B} c[x,y]$$

for the motion-compensated reference picture and $$\sum_{[x,y] \in B} s[x,y]$$

for the current picture. The calculation of $$\sum_{[x,y] \in B} c[x,y]$$

may be stored and reused for different candidate motion vector offsets in the reference picture. When later pictures in the video sequence are encoded, the current picture may be used as a reference picture for a later picture. Here, the result of the computation of the sum norm of the current picture may be stored and reused as $$\sum_{[x,y] \in B} c[x,y]$$

when the current picture is used as a reference picture for coding another dependent picture. Thus, the overhead of computing sum norms in the instant embodiment of the present invention is reduced by RN times.

In addition, for motion estimation, the sum of absolute difference of sum norm for $\tilde{D}(s,c)$ is computed as in equation (3) for different block types. The result of the computation of the absolute difference of sum norm for smallest block size is stored and reused by larger block types. Thus, the overhead of computing the absolute difference of sum norm can be reduced by BN times.

A new criterion called New SEA ("NSEA") is now provided for use in SEA to discard non-optimal points other than (4). In SEA, because of the triangle inequality, the only points that are discarded are those that are mathematically impossible to have the lowest SAD, so the same motion vector is always selected as when the full-search method is used. In NSEA, this guarantee is no longer held, and the resulting motion vector may differ from the full-search method, increasing the bitrate of the compressed sequence. As $\tilde{D}(s,c)$ is highly correlated with $D(s,c)$, the increase in bitrate is likely to be slight. However, the number of points to discard in the search can be significantly reduced for NSEA, reducing the video encoder complexity greatly.

NSEA is described as follows:

Assume Dmin is the smallest distortion value previously computed in the block motion search;

$$\text{then discard block } c \text{ if } \tilde{D}(s,c) \geq \alpha D\text{min}+\beta;\quad(5)$$

otherwise, perform full search.

In (5), the factors $\alpha$ and $\beta$ can be dynamically adjusted, so a tighter lower bound may be chosen, which can further reject non-optimal searching points without doing a full search. In some cases, the rate-constrained distortion can be employed to further improve the coding efficiency, i.e., $$J(s,c)=D(s,c)+\lambda_{motion}R_{motion}+\lambda_{ref}R_{ref},\quad(6)$$

where Rmotion and Rref are the bits for coding motion vector and reference picture, respectively, while $\lambda$motion and $\lambda$ref are used to balance rate and distortion so a global optimization can be achieved. Rate-constrained distortion in (6) is one way of rate distortion optimization which can greatly improve the coding efficiency.

The SEA algorithm in (5) thus be changed accordingly:

Assuming Jmin is the smallest rate-constrained distortion value previously computed in the block motion search;

then discard block $c$ if $$J(s,c) \geq Jmin = \alpha Dmin + \beta + \lambda_{motion}R_{motion}\lambda_{ref} + R_{ref};  \quad (7)$$

otherwise, perform full search.

This algorithm can be further improved by using a better initial Dmin/Jmin and searching order. The procedure of such an embodiment is as follows:

For each predictive picture,
compute sum norm for current picture $$\sum_{[x,y] \in B} s[x, y]$$

as in equation (3);

define a set of predictors P;

examine D(s,c)/J(s,c) within the set P, find the minimum as initial Dmin/Jmin;

adjust the search center and search range to include the optimal predictor which achieves initial Dmin/Jmin as in step 3;

apply NSEA algorithm described in (5)/(7) with data reuse for motion compensated coding;

compute and store new sum norm for reconstructed picture as $$\sum_{[x,y] \in B} c[x, y]$$

The present invention is not restricted to the exemplary fast searching algorithm embodiment. Alternate embodiments may be directly applied to other heuristic fast search algorithms as known in the art. Because the calculation of sum norm is cheaper, and the result can be reused, $\tilde{D}(s,c)$ can be used for other applications. For example, in motion estimation as in H.264, a fast method to select a reference picture for motion compensation without losing too much quality is preferred. Because of the high correlation between $\tilde{D}(s,c)$ and $D(s,c)$, $\tilde{D}(s,c)$ may be used here as a metric to select which reference picture is to be used for motion compensation. In addition, the speed of motion searching also relies on the searching order. A new searching order may be defined based on the increasing quantity of $\tilde{D}(s,c)$. So, if at a certain point $\tilde{D}(s,c) >= D$ min, there is no need to look at the subsequent searching points.

The computational savings of embodiments of the present invention can be applied to other applications, such as, for example, expanding the searching range or adapting better algorithms for other usages. Embodiments of the present invention may be used directly with many different video compression standards that employ motion estimation, such as, for example, H.261, H.263, H.264, MPEG-1, MPEG-2, and MPEG-4.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

In accordance with one exemplary embodiment, the present invention may be implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for encoding video signal data for an image block, the method comprising:

receiving a substantially uncompressed image block;

block matching the image block in correspondence with at least one particular reference picture while excluding non-optimal search points in accordance with a comparison of a normalization of the image block pixels against a normalization of the reference picture pixels;

computing motion vectors corresponding to a difference between the image block and the at least one particular reference picture; and motion compensating the at least one particular reference picture in correspondence with the motion vectors.

2. A method as defined in claim 1 wherein computing motion vectors comprises:

testing within a search region for displacements within a pre-determined range of offsets relative to the image block while excluding non-optimal search points in accordance with a comparison of a normalization of the image block pixels against a normalization of the reference picture pixels;

calculating at least one of a sum of the absolute difference, a sum of the square difference, and a mean squared error of each pixel in the image block with a motion compensated reference picture; and selecting the offset with the lowest calculated sum of the absolute difference, sum of the square difference, or mean squared error as the motion vector.

3. A method as defined in claim 1 wherein block matching comprises:

storing a normalization of the current picture; and reusing the stored normalization when the current picture is used as a reference picture for coding another picture.

4. A method as defined in claim 1 wherein block matching comprises:
   storing a normalization of the smallest block size; and
   reusing the stored normalization for larger block sizes.

5. A method for processing video signal data for an image block, the method comprising encoding as defined in claim 1 and decoding, the decoding comprising:
   receiving at least one reference picture index with the data for the image block, each corresponding to a particular reference picture;
   retrieving a reference picture corresponding to each of the received at least one reference picture index; and
   motion compensating the retrieved reference picture to form a motion compensated reference picture.

6. A method as defined in claim 5, further comprising adding the motion compensated reference picture to the data for the image block to predict the image block.

7. A method as defined in claim 6, further comprising storing the predicted image block as a reference picture for future retrieval.

8. A method as defined in claim 5 wherein the video signal data is streaming video signal data comprising block transform coefficients.

9. A video CODEC comprising a video encoder as defined in claim 1 and a video decoder for decoding video signal data for an image block and at least one particular reference picture index to predict the image block, the decoder comprising a motion compensator having an output for determining a block corresponding to the particular reference picture index.

10. A video CODEC as defined in claim 9, further comprising a variable length decoder (410) in signal communication with the motion compensator (460) for providing the particular reference picture index to the motion compensator.

11. A video CODEC as defined in claim 9 wherein the motion compensator is for providing motion compensated reference pictures responsive to the fast search block motion estimator.

12. A video CODEC as defined in claim 9 wherein the video signal data is streaming video signal data comprising block transform coefficients.

13. A video encoder for encoding video signal data for an image block relative to at least one particular reference picture, the encoder comprising a fast search block motion estimator for providing motion vectors corresponding to the at least one particular reference picture, the motion estimator comprising a fast search block matching portion for performing fast search block matching while excluding non-optimal search points in accordance with a comparison of a normalization of the image block pixels against a normalization of the reference picture pixels, the fast search block matching portion having an output responsive to the at least one particular reference picture.

14. A video encoder as defined in claim 13 wherein the fast search block matching portion comprises at least one of a data reuse portion and a successive elimination portion.

15. A video encoder as defined in claim 13 wherein the fast search block matching portion comprises a data reuse portion adapted to store the normalization of the current picture and reuse the stored normalization when the current picture is used as a reference picture for coding another picture.

16. A video encoder as defined in claim 13 wherein the fast search block matching portion comprises a data reuse portion adapted to store the normalization of the smallest block size and reuse the stored normalization for larger block sizes.

17. A video encoder as defined in claim 13 wherein the fast search block matching portion comprises at least one of a sum of the absolute difference calculator, a sum of the square difference calculator, and a mean squared error calculator for performing normalization.

18. A video encoder as defined in claim 13, further comprising a reference picture store in signal communication with the fast search block motion estimator for providing the at least one particular reference picture and a corresponding particular reference picture index.

19. A video encoder as defined in claim 18, further comprising a variable length coder in signal communication with the reference picture store for encoding the particular reference picture index corresponding to the at least one particular reference picture.

20. A video encoder as defined in claim 13, further comprising a motion compensator in signal communication with the fast search block motion estimator for providing motion compensated reference pictures responsive to the fast search block motion estimator.

* * * * *